United States Patent
Freiwald et al.

(10) Patent No.: US 7,062,632 B2
(45) Date of Patent: Jun. 13, 2006

(54) METHOD FOR CONTROLLING A CENTRAL PROCESSING UNIT FOR ADDRESSING IN RELATION TO A MEMORY AND CONTROLLER

(75) Inventors: Juergen Freiwald, Egmating (DE); Dirk Rabe, Munich (DE)

(73) Assignee: Infineon Technologies AG, Munich (DE)

( * ) Notice: Subject to any disclaimer, the term of this patent is extended or adjusted under 35 U.S.C. 154(b) by 315 days.

(21) Appl. No.: 10/760,108

(22) Filed: Jan. 16, 2004

(65) Prior Publication Data
US 2004/0177230 A1 Sep. 9, 2004

Related U.S. Application Data

(63) Continuation of application No. PCT/EP02/06655, filed on Jun. 17, 2002.

(30) Foreign Application Priority Data
Jul. 18, 2001 (EP) .................................. 01117389

(51) Int. Cl.
G06F 12/00 (2006.01)
(52) U.S. Cl. ........................ 711/212; 711/213; 711/2; 711/220
(58) Field of Classification Search ................. None
See application file for complete search history.

(56) References Cited

U.S. PATENT DOCUMENTS

| | | | |
|---|---|---|---|
| 4,675,810 A * | 6/1987 | Gruner et al. .............. 711/202 |
| 5,485,624 A * | 1/1996 | Steinmetz et al. ............ 712/34 |
| 5,590,296 A * | 12/1996 | Matsuo ....................... 712/229 |
| 5,826,074 A * | 10/1998 | Blomgren ................... 712/234 |
| 6,023,750 A | 2/2000 | Hansen et al. |
| 6,026,478 A | 2/2000 | Dowling |
| 6,199,155 B1 * | 3/2001 | Kishida et al. ............ 712/210 |
| 6,564,283 B1 * | 5/2003 | Ahn ............................ 711/2 |

FOREIGN PATENT DOCUMENTS

| | | |
|---|---|---|
| DE | 43 40 551 A1 | 6/1995 |
| WO | WO-83/00240 A1 | 1/1983 |
| WO | WO-00/55723 A1 | 9/2000 |

* cited by examiner

*Primary Examiner*—Matthew D. Anderson
*Assistant Examiner*—Michael Krofcheck
(74) *Attorney, Agent, or Firm*—Dickstein, Shapiro, Morin & Oshinsky, LLP.

(57) ABSTRACT

The present invention is based on the finding that free CPU operation code identifiers of a CPU or CPU operation code identifiers useable for any reason can be used to control supporting means upstream of the CPU, which is able to form, responsive to these operation code identifiers, a new, for example, physical address in relation to a second memory area having a second memory which is larger than the, for example, logic memory size addressable by the CPU. By means of the special operation code identifiers, it is thus possible in the course of an executable machine code to address the supporting means which monitors the data traffic via which the operation codes to be processed or the operation code identifiers are provided to the CPU, from the memory to the CPU, and which can take measures in relation to the new formed address when certain special operation code identifiers occur. In this way, on the one hand, a complicated redesign of the CPU and, on the other hand, the necessity of a software-resetting of the current memory window complicated as regards both the executable machine code and the processing speed are avoided.

28 Claims, 5 Drawing Sheets

METHOD FOR CONTROLLING A CENTRAL PROCESSING UNIT FOR ADDRESSING IN RELATION TO A MEMORY AND CONTROLLER

CROSS-REFERENCE TO RELATED APPLICATION

This application is a continuation of copending International Application No. PCT/EP02/06655, filed Jun. 17, 2002, which designated the United States and was not published in English.

BACKGROUND OF THE INVENTION

1. Field of the Invention

The present invention relates to controllers, such as, for example, microcontrollers, microprocessors and the like, as are, for example, employed in ASICs (application specific integrated circuit), SOCs (system on chip) and the like, and, in particular, to controllers basing on a CPU architecture (CPU=central processing unit) which do not support an addressing of a memory size required.

2. Description of the Related Art

Although the development of microprocessors and microcontrollers has led to considerable performance increases, in certain technological fields of application, such as, for example, in the chip card area or in SOC designs, older CPU architectures are preferred to newer architectures when integrating a CPU in an integrated circuit. A reason for this is that newer CPU architectures having a higher performance are often oversized for the respective field of application provided and thus, as regards the tasks to be performed, require too much power and take up too much chip area. Another reason for preferring an older CPU architecture to a newer, more powerful one is that the software development environment for the older CPU architectures, such as, for example, the 8051- or 8052-based microcontroller architecture, is often more popular with customers, and that more software developers are available for them.

The problem of the software development environment, more popular with customers, for older controller architectures is of particular importance in the chip card area, since in this case the generation of the machine programs which can be processed on the chip card or of executable machine codes does not fall into the responsibility of the chip manufacturer but, for reasons of safety, of major customers, such as, for example, banks and their software development companies, and of the respective operating system developing company. In addition, due to the high numbers required, it is of enormous importance for the chip card customers to use chip card controllers adapted to the respective requirements in order to keep the cost as low as possible. In order to satisfy the low-end chip card area and to meet the desire of some customers for well-known software developing environments, the chip card manufacturer consequently has to be in a position to offer chip cards basing on an older microcontroller architecture.

A problem in using older controller architectures in chip card manufacturing, however, is that their ways of addressing are not sufficient. Thus, in the chip card area, the capability of an 8051-based CPU is basically sufficient to take over the managing tasks of a chip card, but for reasons of high safety requirements, cryptography algorithms which include calculating operations in relation to very large operands must be processed on the chip card by cryptocoprocessors. In the well-known RSA (Rivest, Sharmir and Adleman) algorithm, operand lengths of, for example, 1024 are usual. Due to these large operand lengths to be processed and the complexity of the cryptography algorithms themselves, access to the largest possible memory is required in chip cards. Here, the problem of using CPUs basing on older controller architectures is that they only allow an addressing of small memory sizes. 8051-based CPUs, for example, only allow an addressing of 64 kbytes.

A possible solution for rendering addressable a large memory despite the usage of a controller having an older architecture is to use externally stored descriptors or basis addresses determining the position of a memory window addressed by the CPU so that the memory area addressable by the CPU can be shifted over the entire larger memory by means of the memory window. FIG. 4 shows a block diagram of an 8-bit controller generally indicated at 800 and consisting of an 8051-based CPU 805 and an MMU (memory management unit), and a memory 815 connected to the controller 800, which can consist of different memory types, such as, for example, a read-only memory (ROM), a random access memory (RAM), a non-volatile memory (NVM), such as, for example, an EEPROM or a flash memory, and the like, and is only illustrated as a block for a better understanding. The CPU 805 is connected, via an 8-bit address line 820 and a bidirectional 8-bit data line 825, to the MMU 810 which, in turn, is connected to the memory 815 via a 12-bit address line 840 and a bidirectional 8-bit data line 845. In the case of a chip card, the controller 800 is, for example, connected to further components, such as, for example, a cryptocoprocessor for performing cryptography algorithms, an interrupt module, a contact or contactless interface for performing the communication to a terminal, a random number generator and further components, which are not illustrated in FIG. 4 for simplification.

A problem with the controller 800 of FIG. 4 is that the CPU 805 is based on an 8-bit architecture and, as regards its command set 855, only allows an addressing of 64 kbytes, while the size of the memory 815, in the case of a chip card, must be larger and, in the example of FIG. 4, is for example one megabyte. The reason why only 64 kBytes are addressable for the CPU 805 is that in data accesses by means of the command set 855, and, in particular, by means of the read/write commands, such as, for example, the MOV commands, and in code accesses for producing an address, only two bytes (16 bits) are used which only allow coding of $2^{16}$=64 k states.

When executing a read command, the CPU 805 outputs the 16-bit address on the 8-bit address line 820 and the 8-bit data line 825. As a response, the CPU 805, on the data lines 825, waits for the memory contents of the memory 815 at the address required. In order to enable addressing the 1-MB memory 815, a data descriptor 860 is stored outside the CPU 805 in the MMU 810 indicating a basis address added to the 16-bit address by the CPU 805, whereupon the result is output on the 12-bit address line 840 and the 8-bit data line 845 for addressing to the memory 815. In this way, a 64 k data memory window 865 in the memory 815 is defined by the descriptor 860, the starting address of which corresponds to the basis address indicated by the descriptor 860. By providing the descriptor 860 and the MMU 810, it is ensured that the CPU 805 will always access the memory window 865 in memory accesses in relation to the memory 815, wherein the address output by the CPU 805 indicates the offset of the byte to be read within the memory window 865. The CPU 805 executes a write or read command, wherein the MMU 810 translates the 16-bit address from the CPU 805 into a physical 20-bit address and redirects the access correspondingly.

Although the concept of the descriptor 860 can be extended to any memory sizes in connection with the MMU 810, it is of disadvantage in that, in memory accesses to addresses of the memory 815 outside the memory window 865, the MMU 810 must first be reconfigured, i.e. the descriptor 860 must be reset correspondingly. This reconfiguration of the MMU 810 is especially complicated since it requires a software-setting of the descriptor 860 and since, in a memory continually visible (i.e. addressable) for the CPU 805, a managing code 870 must be stored, including an MMU setting code for setting the descriptor 860, which reduces the memory directly addressable, which is mostly very small anyway. In addition, the setting of the descriptor 860 requires additional clock cycles, which reduces the operating speed of the controller. Assuming the memory sizes indicated above, the duration for a data access to a memory address of the memory 815 outside the memory window 865, for a compiled program, is, for example, 140 clock cycles compared to 4 clock cycles for memory accesses within the current memory window 865.

The problem of the MMU reconfiguration increases in the area of code accesses wherein, in a corresponding way, a code descriptor 875 defines a code memory window 880, in that, when executing subprograms, i.e. call commands, in memory areas outside the memory window 880, the return jump into the currently set memory window 880 must be ensured. While only the code descriptor 875 must be reset when leaving the currently set memory window 880 while processing the machine code in the normal command sequence, i.e. when there is no jump command, or in jump commands without return intention, like in data accesses, it must be ensured in jump commands with return intention that, in the case of the return jump, the code descriptor 875 is set to the original value. In order to ensure this, the managing code 870 must further comprise an initializing code called in each jump command with return intention relating to a destination outside the currently set code memory window 880 to ensure the restoration of the descriptor settings before the jump when returning.

A possible software-realization is to provide, for each bank, i.e. each possible memory window position, of the memory 815, an initializing code and a setting and resetting code organized in a table and stored in the continually visible memory area of the memory 815. In order to perform a jump command with return intention beyond the limits of the currently set memory window 865, a jump command with return intention, from a program code, into a function in the continually visible memory area must take place, loading, into an internal register 885, such as, for example, a data pointer DPTa, the 16-bit address of the destination code in relation to the destination bank, i.e. the offset within the destination bank, where the command to which has been jumped is, and subsequently calling the initializing code with a jump command without return intention into the continually visible memory area. By executing the initializing code, the address of the MMU resetting code for recovering the currently set window 880 or the current bank is at first shifted to a stack or stack memory 890, then the address written before into the internal register 885 is shifted to the stack 890 and finally the MMU setting code for the new destination MMU bank is called by a jump command without return intention. At the end of the setting code, after MMU reconfiguring has taken place, a jump is performed to the desired function or the desired subprogram in the new set memory window with a return jump command. After processing the function, the MMU resetting code for restoring the original MMU configuration or for recovering the originally set memory window 880 is called by a return command to recover the original MMU setting. The return jump command at the end of the resetting code then, within the newly set memory window 865, jumps to the corresponding following position in the program code. In order to be able to reset the MMU 810 by means of the CPU commands contained in the MMU setting or resetting code, either special commands can be provided with which the CPU 805 can address the MMU 810 and the descriptors 860 and 875, respectively, or the MMU 810 responds to reserved 8-bit addresses from the CPU 805 on the address and data lines 820 and 825.

In order to realize a memory area within the memory 815, continually addressable or visible for the CPU 805, not all the 16-bit addresses output by the CPU 805 are mapped by the MMU 810 to the memory window 865 but to a fixed memory area of the memory 815 so that the effectively addressable size of the memory window 865 is reduced by the managing code 870.

SUMMARY OF THE INVENTION

It is the object of the present invention to provide a method for controlling a central processing unit for addressing in relation to a memory and a controller so that the addressing of memory sizes exceeding the memory size which can be addressed as a maximum by the CFO due to its architecture, is less complicated.

In accordance with a first aspect, the present invention provides a method for controlling a central processing unit for addressing in relation to a memory, wherein a set of operation code identifiers including at least one special operation code identifier is associated to the central processing unit, wherein the central processing unit is arranged to address a first memory area having a first memory size of the memory, wherein the method includes the following steps: monitoring a data traffic from the memory to the central processing unit by supporting means coupled to the central processing unit; in the case in which the data traffic from the memory to the central processing unit includes the special operation code identifier, forming a new address by the supporting means, wherein the new address is defined in a second memory area having a second memory size of the memory, wherein the second memory size is larger than the first memory size; providing a predetermined operation code identifier to which a jump command from a command set of the central processing unit is assigned, to the central processing unit by the supporting means, wherein the predetermined operation code identifier has a destination address in relation to the first memory area; and managing a code descriptor by the supporting means, yielding, together with the destination address, the new address.

In accordance with a second aspect, the present invention provides a controller having: a central processing unit having a set of operation code identifiers including at least one special operation code identifier, wherein the central processing unit is arranged to address a first memory area having a first memory size of a memory; supporting means coupled to the central processing unit to monitor a data traffic from the memory to the central processing unit, wherein the supporting means is arranged to perform, in the case in which the data traffic from the memory to the central processing unit includes the special operation code identifier, the following steps: forming a new address, wherein the new address is defined in a second memory area having a second memory size of the memory, wherein the second memory area is larger than the first memory area, and providing a predetermined operation code identifier to which a jump command from a command set of the central processing unit is assigned, to the central processing unit, wherein the predetermined operation code identifier has a destination address in relation to the first memory area; and managing a code descriptor, yielding, together with the destination address, the new address.

In accordance with a third aspect, the present invention provides a method for controlling a central processing unit for addressing in relation to a memory, wherein a set of operation code identifiers including at least a special operation code identifier is associated to the central processing unit, wherein the central processing unit is arranged to address a first memory area having a first memory size of the memory, wherein the method includes the following steps: monitoring a data traffic from the memory the central processing unit and a data traffic from the central processing unit to the memory by supporting means coupled to the central processing unit; if the data traffic from the memory to the central processing unit includes the special operation code identifier, forming a new address by the supporting means, wherein the new address is defined in a second memory area having a second memory size of the memory, wherein the second memory size is larger than the first memory size; providing a predetermined operation code identifier to which a command from the command set of the central processing unit is assigned, to the central processing unit by the supporting means; and manipulating an address defined in relation to the first memory area, within the data traffic from the central processing unit to the memory based on the new address by the supporting means in order to obtain a manipulated address in relation to the second memory area.

In accordance with a fourth aspect, the present invention provides a controller having: a central processing unit having a set of operation code identifiers including at least a special operation code identifier, wherein the central processing unit is arranged to address a first memory area having a first memory size of a memory; supporting means coupled to the central processing unit in order to monitor a data traffic from the memory to the central processing unit and a data traffic from the central processing unit to the memory, wherein the supporting means is arranged to perform, in the case that the data traffic from the memory to the central processing unit includes the special operation code identifier, the following steps: forming a new address, wherein the new address is defined in a second memory area having a second memory size of the memory, wherein the second memory size is larger than the first memory size; providing a predetermined operation code identifier to which a command from the command set of the central processing unit is associated, to the central processing unit; and manipulating an address defined in relation to the first memory area, within the data traffic from the central processing unit to the memory based on the new address in order to obtain a manipulated address in relation to the second memory area.

The present invention is based on the finding that free CPU operation codes of the CPU, i.e. operation codes to which no command from the command set of the CPU has been assigned and which, in the following, will be referred to as free operation codes, or CPU operation code identifiers to which a command is already assigned but which are usable for another reason or are free as regards certain operands can be used to control supporting means upstream of the CPU, which is able to form, responsive to operation code identifiers generally referred to as special operation code identifiers, a new, for example, physical, address in relation to a second memory area having a second memory size which is larger than the, for example, logic memory size addressable by the CPU. By means of the special operation code identifiers, it is possible in the course of an executable machine code to address supporting means which monitors the data traffic from the memory to the CPU, via which the operation code identifiers to be processed are supplied to the CPU, and which can take measures as regards the new formed address when certain special operation code identifiers occur. In this way, on the one hand, a complicated redesign of the CPU and, on the other hand, the requirement for a software-resetting of the current memory window complicated as regards both the executable machine code and the processing speed are avoided.

According to an aspect of the present invention relating to program jumps, supporting means is able to provide, to the CPU, an operation code identifier assigned to a jump command from the command set of the CPU. The jump command operation code identifier contains a suitable destination address as regards the first, such as, for example, logic, memory area to suitably set a program counter. The supporting means at the same time manages a descriptor of the MMU, which indicates the position of the first memory area within the memory area or which is set such that the destination address, together with the code descriptor, results in the new address. The jump command supplied to the CPU relates to a destination address in relation to the first memory area. The supporting means sets the destination address to which the jump command is related and the code descriptor such that the new address is in the first, for example, logic memory area, and thus the destination address to which the jump command supplied to the CPU refers, in connection with the descriptor, corresponds to the new, for example, physical address. In this way, the supporting means, responsive to only a special operation code identifier, ensures that, on the one hand, the descriptor and, on the other hand, the program counter for the next code access of the CPU to request the next operation code identifier to be processed from the memory are set suitably, wherein a managing code would be required for this in the software solution illustrated in the introductory description.

According to another aspect of the present invention referring to a data access command, the supporting means is able to supply a predetermined CPU operation code to the CPU in order to "stimulate" it suitably or to put it in a suitable state, and to manipulate an address the CPU outputs to the memory, based on the new formed address so that, from the perspective of the memory, the impression results that the CPU were able to address the second memory area. In the case that, during a program, the contents at a certain address of the memory outside the set memory window or the first memory area is to be read, that is in relation to the second memory area, a free operation code provided for this may, for example, be inserted into the processable machine code. If it is requested by the CPU as the next command to be processed from the memory, the supporting means responds to determine a new address for example, from either a part of the operation code itself or from register information within the CPU or from register information outside the CPU, such as, for example, in the supporting means. The memory is read out at this address. In addition, one or several CPU operation codes are supplied to the CPU in order for the CPU to enter a subsequently supplied memory contents into a desired destination register in the CPU. Additionally, the program counter for indicating the next operation code to be executed in the memory is set suitably so that the memory can be accessed with the new address so that the memory contents of the new address can be read and can be output to the CPU. Even in the case of data accesses, no managing code is consequently required to shift the first memory area or the memory window set before.

By providing the usage of the free operation codes or of special operation code identifiers to control supporting means forming the new addresses outside the CPU, a direct addressing of the entire memory beyond the memory area directly addressable by the CPU with the CPU operation code identifiers can be preferably obtained without having to perform essential changes on the setup of the CPU. By the fact that the supporting means is upstream of the CPU, i.e. connected to the CPU in such a way that it can monitor the data traffic from the memory to the CPU, the free operation code identifiers not assigned to a command from the command set of the CPU can, for example, be intercepted by the supporting means before they reach the CPU. On the basis of the new address formed by the supporting means, to which the free operation code refers, the supporting means can suitably stimulate or control the CPU and, if required, suitably manipulate the address signals of the CPU towards the outside, i.e. in relation to the memory. A prepared software-resetting of a descriptor or a basis address is not required, whereby, on the one hand, providing a managing code is omitted and, on the other hand, the number of clock cycles a code jump or a data access from a currently set memory window requires is reduced. By omitting the managing code, no memory space in the memory area continually addressable or visible for the CPU is occupied.

Another advantage of the present invention is that a down compatibility to machine codes which only base on the CPU operation code identifiers can be ensured since the supporting means may be transparent or imperceptible for CPU operation code identifiers. In addition, the supporting means can be provided to reset a code descriptor or data descriptor in data accesses and jump commands in relation to addresses outside the currently set memory window so that resetting the memory window can be obtained by only one free or special operation code identifier. By hardware-processing the free or special operation code identifiers outside the CPU, additional interrupts during, for example, resetting the descriptors can be avoided so that, compared to software-resetting, the susceptibility to failure is reduced.

BRIEF DESCRIPTION OF THE DRAWINGS

Preferred embodiments of the present invention will be detailed subsequently referring to the appended drawings in which.

DESCRIPTION OF PREFERRED EMBODIMENTS

Referring to the subsequent detailed description of an embodiment of the present invention, it is to be noted that it refers to the controller of a chip card although the present invention may also be applied to controllers in different fields of application, such as, for example, in ASICS, SOCs or TPMs (trusted platform module), or may be embodied as an individual microcontroller element.

It is also to be noted that the following embodiments only rely on free, non-reserved free operation codes to which no command from a command set of the CPU is assigned. It is to be noted that it is also possible in alternative embodiments for controlling the supporting means to use reserved operation codes in the form of operation code identifiers which are suitable for this for different reasons, wherein the expression operation code identifier subsequently is intended to include a combination of an operation code and an optional operand, such as, for example, an address section. It could, for example, be the case that a certain command is not supported or used by the compiler and the operation code of which thus can be employed otherwise, or that an operation code in combination with a certain operand is free, i.e. undefined.

In addition, it is to be mentioned that the subsequent description refers to a memory having a size of 1 MB addressed by 20 bits, although different memory sizes, such as, for example, 14 MB, and different numbers of bits for addressing, such as, for example, 24, are also possible.

Figure 1:
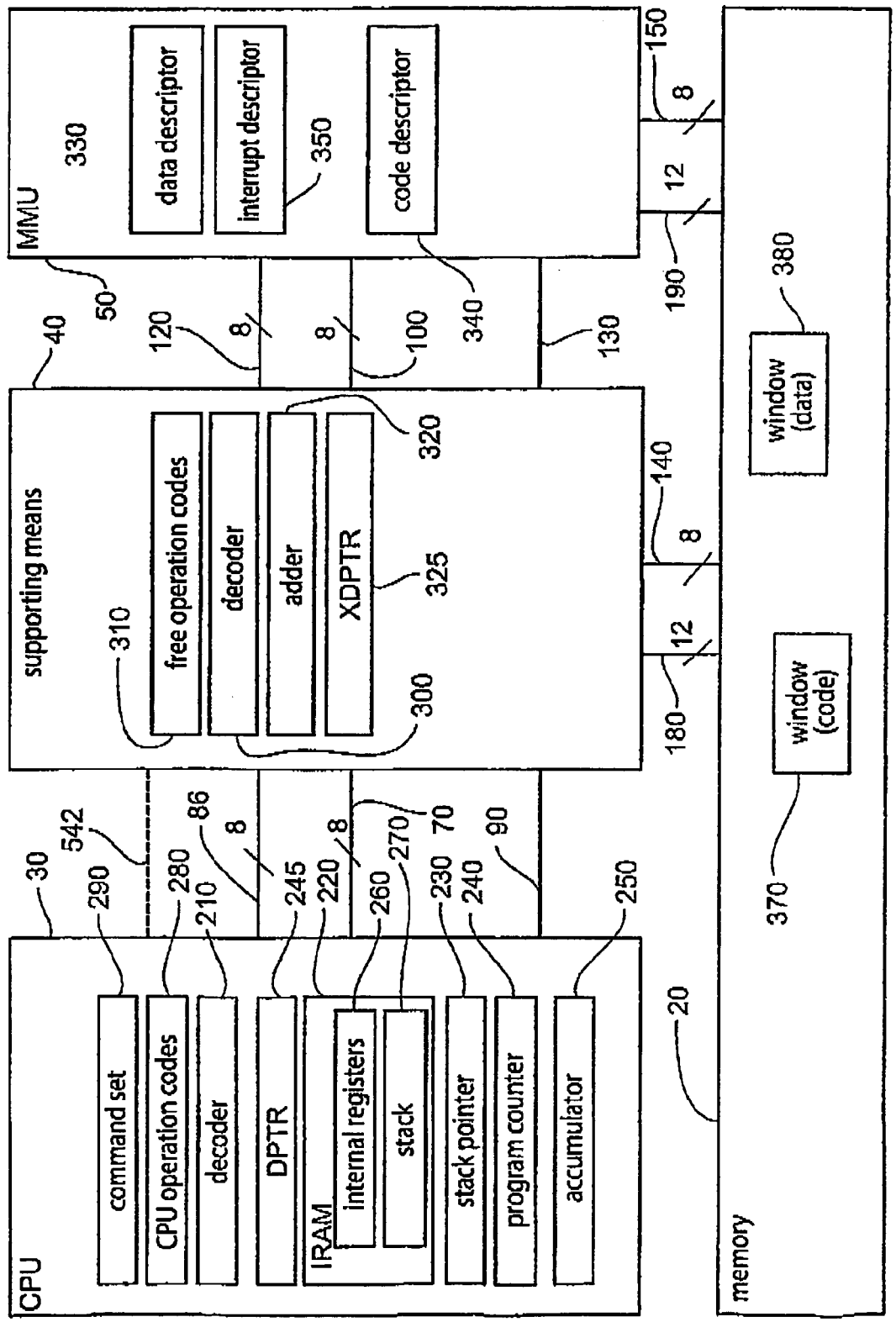
FIG. 1 is a block diagram of a controller according to an embodiment of the present invention.

FIG. 1 shows a microcontroller generally indicated at 10 according to an embodiment of the present invention, and a memory 20. The controller 10 includes a CPU 30, supporting means 40 and an MMU or memory managing unit 50. The CPU 30 is based on an 8051 controller architecture and is connected to the supporting means 40 via a bidirectional 8-bit data line 60, an 8-bit address line 80 and an interrupt line Int 90. The supporting means 40 is connected to the MMU 50 via a bidirectional 8-bit data line 100, an 8-bit address line 120 and an interrupt line Int 130. Both the supporting means 40 and the MMU 50 are connected to the memory 20 via an 8-bit data line 140 and 150, respectively, and a 12-bit address line 180 and 190, respectively.

The CPU 30, apart from other components not shown, such as, for example, adders, includes a decoder 210, an internal RAM IRAM 220 as well as internal registers to which a stack indicator or stack memory indicator 230, a program counter 240, a data counter register DPTR 245 and an accumulator 250 belong. Further internal registers 260 are provided in the IRAM 220 in which a stack memory or stack 270 is further provided. The decoder 210 decodes operation codes or operation code identifiers 280 supplied to the CPU 30 on the 8-bit data line 60, wherein to each CPU operation code or operation code identifier 280, a command from a command set 290 of the CPU 30 is assigned.

The supporting means 40 also includes a decoder 300 to decode operation codes or operation code identifiers supplied to the supporting means 40 on the 8-bit data line 140 from the memory 20. The supporting means 40 responds to certain operation codes 310 which do not belong to the CPU operation codes 280 or are not for those reserved operation codes, and to which consequently no command from the command set 290 of the CPU 30 is assigned. These operation codes will be referred to as free operation codes 310 subsequently. Apart from the decoder 300, the supporting means 40 further includes an adder 320 to modify, as will be discussed subsequently, 20-bit addresses formed in the supporting means 40 by an offset value of, for example, 4 or 16 bits, and an external data pointer register XDPTR 325 having a size of three bytes.

The MMU 50 includes external registers for storing a data descriptor 330, a code descriptor 340 and, optionally, an interrupt descriptor 350.

Apart from the components mentioned, the CPU 30, the supporting means 40 and the MMU 50 each include controlling means which are, however, not shown and perform control tasks obvious from the following description.

It is to be pointed out that the chip card controller 10 may further be connected to other components not shown in FIG. 1 for reasons of clarity. One or several cryptocoprocessors for performing cryptography algorithms, a transmission/reception interface, such as, for example, an UART module (universal asynchronous receiver-transmitter), an oscillator for producing an internal clock, an interrupt module for hardware-generating interrupt signals and a random number generator which are connected to the controller 10, and, for example, particularly to the supporting means 40 via an address data bus can, for example, belong to the components connected.

The set of operation code identifiers the CPU 30 includes, in the present case, consists of CPU operation code identifiers 280 and free operation code identifiers 310. Each operation code identifier generally consists of an operation code indicating the type of command and thus the manner of processing for either the CPU 30 or the supporting means 40 and, if applicable, of further information, such as, for example, an address portion for indicating an address to which the command associated to the operation code refers, and/or an operand section for indicating an operand to which the command refers, such as, for example, an offset value in relation to the address indicated in the address section, or an addend for an addition command. The overall number of operation codes, and consequently that of the operation code identifiers, is thus limited by the number of coding possibilities for the operation codes.

Corresponding to the limited number of address lines 80 and data lines 60, the command set 290 only allows the CPU 30 to access a memory area with a limited memory size, i.e. 64 kbytes in a bitwise access. Even in code accesses in which the CPU 30 requests the next operation code identifier to be processed by means of the 16-bit code address stored in the program counter 240, addressing is limited to a 64 kBytes memory.

In the present embodiment, the size of the memory 20 is to be, for example, one megabyte, wherein other memory sizes are also possible. The memory 20 can thus include a plurality of memory types, such as, for example, an RAM, ROM, NVM, such as, for example, an EEPROM or a flash memory, or the like. In order to allow the addressing of the entire physical memory 20 by the CPU 30 in data accesses by means of the command set 290 or in code requests, the data descriptor 330 and the code descriptor 340 are provided in the MMU 50, determining the basis addresses or the position for a code window area 370 and a data window area 380 within the memory 20, which have a respective size of 64 kbytes and determine logic memory areas to which the data accesses by means of the command set 290 or the code accesses of the CPU 30 by means of the program counter 240 refer.

The principle of memory accesses with the help of the descriptors 330 and 340 is to be illustrated at first with the example of a read command from the command set 290 provided to write, to the accumulator 250, the memory contents of an address determined in two bytes of the internal registers 260, such as, for example, in the data pointer register DPTR, i.e. in the usual notation, taking the example of the command "MOVX A, @DPTR". It is to be noted that the subsequently described embodiment as well as the following ones refer to scenarios in which the currently requested command immediately follows a jump command, and in which the CPU 30 outputs the address requested in the program counter for requesting the current command. It is possible that in other scenarios in which the currently requested command does not directly follow the jump command, the subsequent address is managed at the memory 20 in the form of an auto-incrementer automatically incrementing a 20-bit code address, and in which the CPU 30 only outputs a request or activation signal to the memory 20.

The CPU 30 requests the command by outputting the 16-bit address stored in the program counter 240 on the address lines 80 and data lines 60. The supporting means 40 passes the address signals on to the address lines 120 and data lines 100 in an unchanged form. The MMU 50 manipulates the address signals indicating the 16-bit code address based on the code descriptor 340. The code descriptor 340, for example, contains more significant 4 bits placed in front of the 16 bits of the code address, whereby 16 possible memory window positions result which, subsequently, will also be referred to as banks. Or the code descriptor 340, apart from the more significant 4 bits which are placed in front of the 16 bits of the code address, contains further bits to allow more than 16 possible memory window positions. The MMU 50 outputs the resulting 20-bit code address to the memory 20 to request the machine code, i.e. in this case "MOVX A, @DPTR". The memory 20 outputs the CPU operation code identifier 280 from the code memory window 370 via the data lines 150, 100 and 60 to the CPU 30, wherein the MMU 50 or the supporting means 40, respectively, passes on the CPU operation code identifier. The decoder 210 decodes the operation code identifier 280 of the command MOVX A, @DPTR and, corresponding to the decoded command on the data and address lines 60, 80, outputs the contents of the data pointer in order to access the corresponding memory contents in the data memory window 380. By being passed on by the supporting means 40, the 16-bit address of the data pointer reaches the MMU 50 producing the corresponding 20-bit address from it together with the data descriptor 330 and outputting it to the memory 20 on the address and data lines 190, 150. The memory 20 returns the corresponding memory contents to the CPU 30 via the data lines 150, 100 and 60, where it is loaded into the accumulator 250 by the CPU 30, as is determined by the operation code of the command MOVX A, @DPTR.

In order to avoid a complicated software-reconfiguring or resetting of the descriptors 330 and 340 before a jump command or a data access beyond the limits of the code memory window 370 or the data memory window 380, respectively, as has been described above, the supporting means 40 is connected to the CPU 30 in such a way that it can monitor the data traffic from the memory 20 to the CPU 30 to be able to respond to the free operation codes 310 before the CPU 30, when they are requested from the code memory window 370 of the memory 20. As will be shown by the subsequent discussion, it can be guaranteed by this arrangement of the supporting means 40 that the formation of a sufficiently large address, i.e. of a 20-bit address, in the supporting means 40 can be guaranteed, while the CPU 30 is suitably "stimulated" by the supporting means 40. The supporting means 40 is further connected to the CPU 30 such that it can monitor the data traffic from the CPU 30 to the memory 20 in order to manipulate address signals the MMU 50 outputs in order to perform addressing in relation to the memory 20.

Figure 2A:
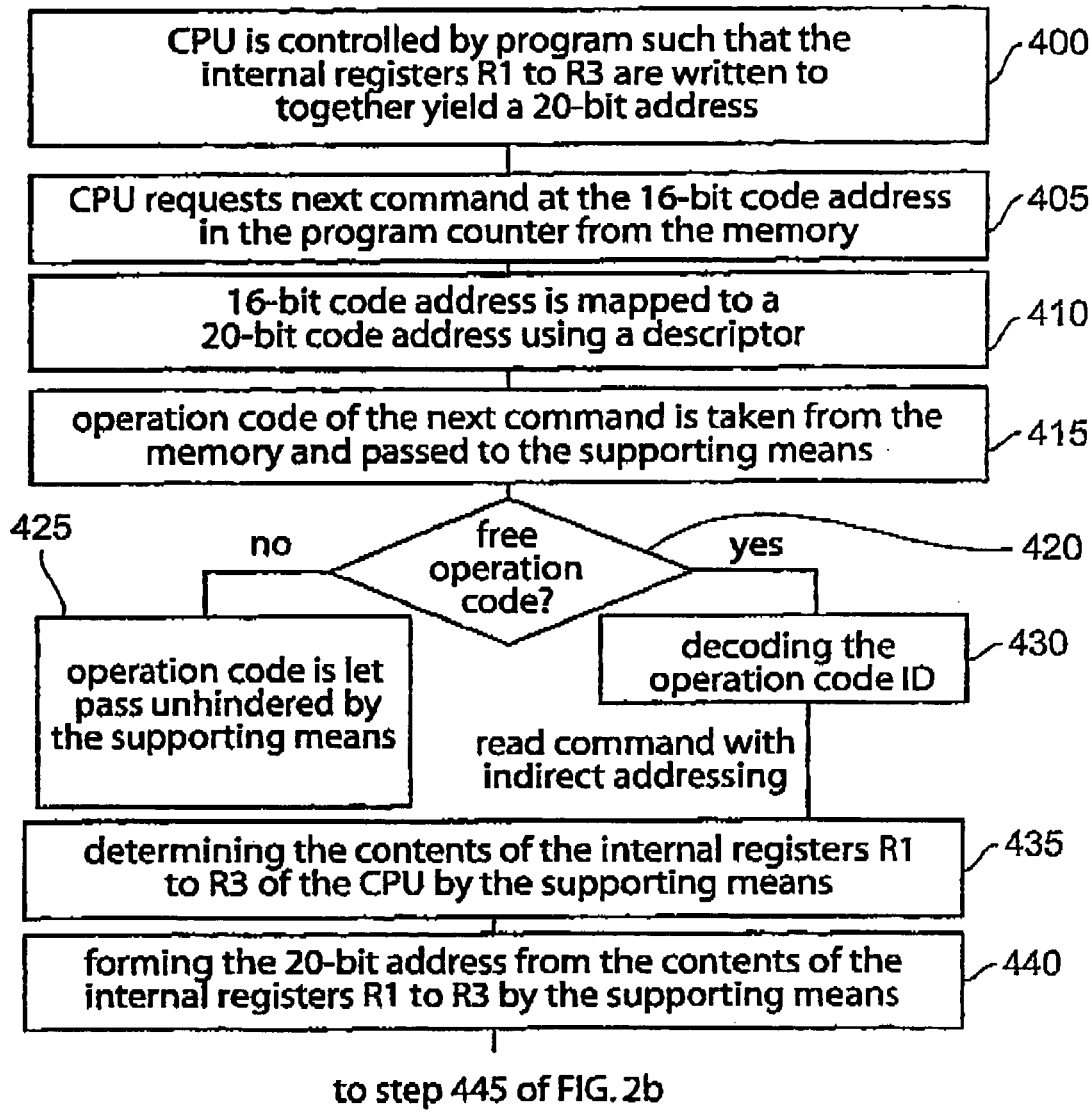
FIGS. 2a and 2b show a flow chart showing the steps performed in the controller of FIG. 1 in the case that a free operation code corresponds to a read command with indirect addressing.
Figure 2B:
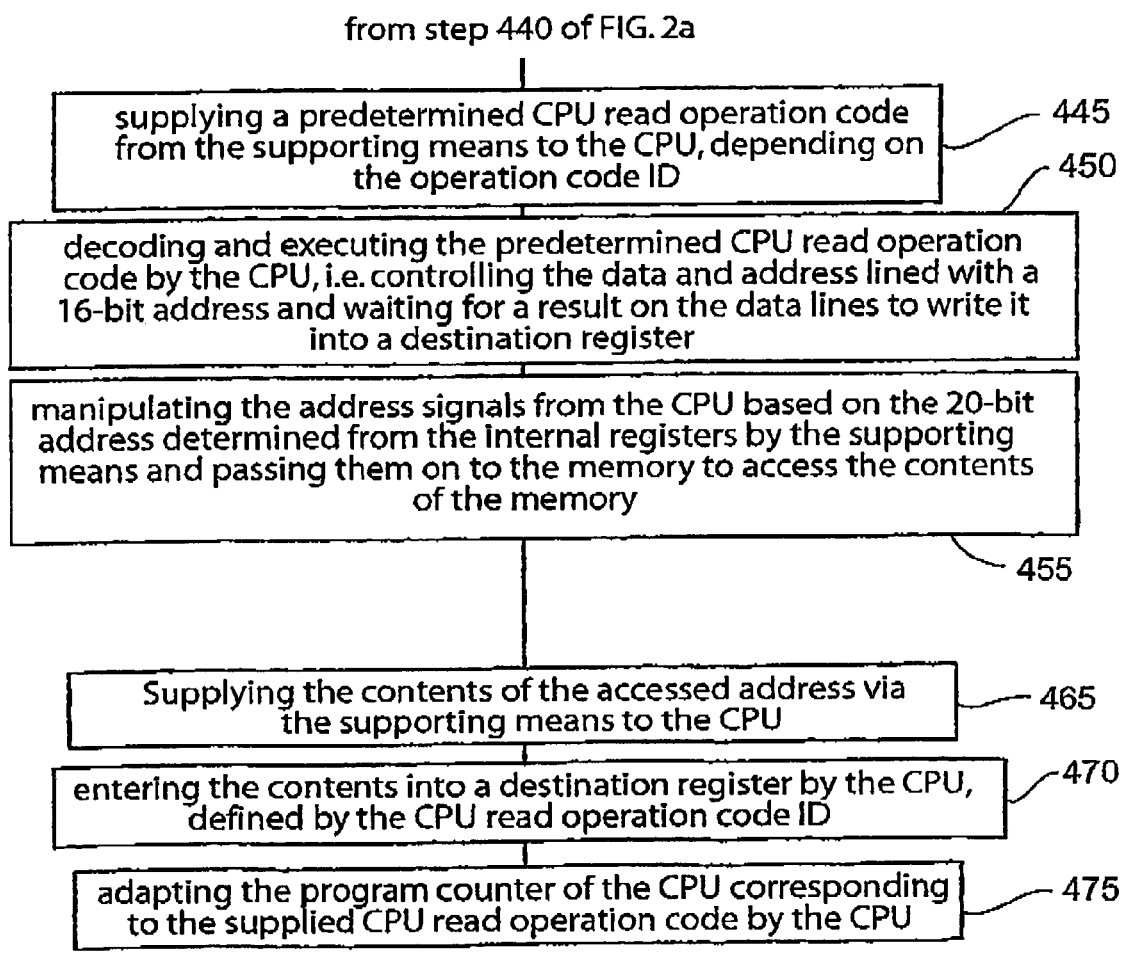

Referring to FIG. 2, a course of steps will be described subsequently, as occurs in the controller of FIG. 1 when the next operation code identifier to be performed following a jump command, which the CPU requests, is a free operation code identifier corresponding to a read or load command referring to an internal destination register of the CPU and a 20-bit source address indicated by means of indirect addressing in internal registers of the CPO 30.

In step 400, the CPU 30 must be, at first, controlled by the executing program in such a way that the registers to which the new read command as regards the address formation is to refer, are loaded to jointly result in the 20-bit address to which the new read command is related. In the embodiment shown in FIG. 2, these are the internal registers R1, R2 and R3 of the CPU. In order to fill these internal registers, the following CPU operation code identifier sequence could, for example, be present in the memory 20 in front of the free operation code identifier: "MOVX A, @Dptr", "MOV R2, A", "MOV R3, #0×13H", wherein Ri with i=1 . . . 3 indicates an internal register Ri, A indicates the accumulator 250, Dptr indicates the data pointer 245 and #0×13H indicates a direct address in a hexadecimal form.

In step 405, the CPu 30 requests a next command to be executed in this case directly following a jump command, by outputting the 16-bit code address stored in the program counter 240 on the address and data lines 80, 60. The 16-bit code address of the program counter 240, in step 410, after it has passed the supporting means 40 unchanged, is mapped or manipulated by the MMU 50 using the code descriptor 340 to a 20-bit code address passing on the MMU 50 to the memory 20. The 16-bit code address stored in the program counter, for example, corresponds to a less significant part of the 20-bit code address, while the code descriptor 340 corresponds to a more significant 4-bit part of the 20-bit address, or a more significant n-bit part, wherein n is, for example, 12. The mapping or manipulation of the 16-bit code address is performed by the MMU 50 by means of supplementing it. Alternatively, the code descriptor 340 can correspond to a 20-bit basis or starting address of a bank so that the mapping is performed by means of adding the descriptor 340 to the 16-bit code address.

In step 415, the operation code identifier of the requested command at the 20-bit code address having resulted from the code descriptor 340 and the 16-bit program counter 240 is taken from the memory 20 and, via the address and data lines 150, 190 and 120, reaches the supporting means 40 unhindered from the MMU 50.

In step 420, the decoder 300 of the supporting means 40 checks whether the operation code identifier received by the memory 20 has a free operation code, as is indicated by the operation code. If, in step 420, the result is that the operation code taken from the memory is not a free operation code, it is, in step 425, passed unhindered in supporting means 40 and passed on the CPU 30 via the address and data lines 60 and 80, whereupon the CPU operation code identifier is decoded and executed by the CPU 30 in the conventional manner. If the operation code from the memory 20 is, however, a free operation code, the operation code will be decoded in step 430 to determine which of the free operation codes 310 the operation code is.

As has been mentioned hereinbefore, in the case of FIG. 2 it is assumed that the operation code is a free operation code corresponding to a read command with indirect addressing. In step 435, the supporting means 40 determines the contents of the internal registers R1 to R3 of the CPU 30. The determination can be realized in different ways. According to an embodiment, the supporting means 40 is further connected to the CPU 30 via a line 542, which makes it possible for supporting means 40 to poll the contents of the registers R1 to R3. This can, for example, be executed with the help of a trace mechanism so that the supporting means 40, via the line 542, is connected to an internal bus of the CPU 30 to which the IRAM 220 is connected, and via which the registers R1 to R3 in the IRAM 220 are loaded. In another embodiment, the supporting means 40, for determining the contents of the registers R1 to R3, uses CPU operation code identifiers which it supplies to the CPU to stimulate the CPU in such a way that it outputs the contents of the registers R1 to R3 on the data line 60, wherein suitable measures are taken to control the program counter 240 suitably.

In step 440, the supporting means 40, from the determined contents, forms the 20-bit address to which the free operation code identifier or the read command is related.

In step 445, a predetermined CPU read operation code identifier is supplied to the CPU 30 by the supporting means 40 depending on the free operation code identifier or the free operation code. Since the free operation code, for example, corresponds to a read command loading the memory contents at the 20-bit address determined from the register contents into the accumulator register 250, the supporting means 40, in the present code, supplies an CPU operation code to the CPU, corresponding to a command "MOVX A, @R1", i.e. a read command as regards the memory 20, provided to load the memory contents at the address indicated by the registers used into the register A. The predetermined operation code identifier, in this case, would only consist of the operation code.

In step 450, the CPU 30 receives the CPU operation code identifier supplied by the supporting means 40 and decodes it. When executing the supplied CPU operation code identifier for the command MOVX, the CPU 30 controls the address and data lines 60 and 80 with the 16-bit address contained in the CPU operation code identifier with respect to direct addressing or determined from an internal register with respect to the indirect addressing and then waits for a result to be supplied on the data lines 60 to write to the destination register, i.e. the accumulator 250.

In step 455, the supporting means 40 manipulates the address signals from the CPU 30 based on the 20-bit address determined from the registers R2 to R3 and passes them on to the memory 20 to access the contents of the memory 20. The manipulation of the address signals or of the 16-bit address, respectively, by the CPU 30 can, for example, comprise replacing it by the 20-bit address itself, adding or supplementing the missing section, such as, for example, the four most significant bits, of the 20-bit address to the 16 bits of the CPU 30 and, if required, in case this has not taken place already in step 430, additionally adding unused bits of the free operation code identifier as an offset value to the result.

In step 465, the memory contents of the accessed 20-bit address is then supplied to the CPU 30 via the data and address lines 60, 80, 140 and 180 and the supporting means 40. In step 470, the CPU 30 which, due to the predetermined CPU read operation code identifier supplied in step 450, is stimulated correspondingly or has been placed in a predetermined state, loads the supplied memory contents into the destination register, i.e. the accumulator 250, as is defined by the CPU read operation code. Finally, the CPU 30, in step 475, adapts the program counter 240 corresponding to the supplied predetermined CPU read operation code identifier, wherein this step can take place at an earlier time.

After step 475, the program counter 240, within the code memory window 370, consequently points to the next command to be processed or operation code identifier according to the normal command sequence and the memory contents of the 20-bit address to which the free operation code identifier has been related is in the accumulator 250. Independently of the position of the currently set data memory window 380, no software-reconfiguration of the MMU 50 or of the data descriptor 330 is required. When realizing the controller shown in FIG. 1, the memory access according to FIG. 2 only takes two more clock cycles than in memory accesses by means of read commands from the command set 290 within the currently set memory window 380.

The addressing when executing the free operation code identifier, in this embodiment, is performed by means of indirect addressing using the CPU's own registers. Nevertheless, in the design of the controller 10 based on an existing CPU layout, hardly any changes of the CPU layout are required so that the implementation of such a controller is not complicated.

Referring to FIG. 2, it is also to be pointed out that it is possible to use an externally arranged register, such as, for example, an XDPTR register 325 for forming the 20-bit address. In this case, the free operation code would include the indication that the XDPTR register is to be used for addressing. This could be loaded with values from internal registers of the CPU, such as, for example, with the contents of the registers R1, R2, R3 in step 400 by other free operation code identifiers. In the latter case, these free operation code identifiers would simply be added to the commands for loading the registers R1 to R3 of step 400. When using such free operation codes using the external register XDPTR 325, the CPU 30 would not have to be changed as regards layout to determine the contents of the registers R1 to R3. This has the advantage that the CPU registers R0 to R7 could be continually used for different purposes in the meantime.

Examples of commands for loading, reading or otherwise using the external register XDPTR 325 are listed subsequently, wherein the usual notation has been used:

| | | |
|---|---|---|
| Xmov XDPTR (R3&R2&R1) | (2B) | |
| Xmov XDPTR (R7&R6&R5) | (2B) | |
| Xpush | (2B) | |
| Xpop | (2B) | |
| Xmov XDPTR, @DPTR | (2B) | Consider MSB (most significant bit), LSB (least significant bit) position |
| Xmov @DPTR, XDPTR | (2B) | Consider MSB (most significant bit), LSB (least significant bit) position |
| Xmov XDPTR, @Ri | (2B) | with i=0...7 |
| Xmov @Ri, XDPTR | (2B) | with i=0...7 |
| Xmov XDPTR, dadr | (2B) | |
| Xmov dadr, XDPTR | (2B) | |
| Xadd XDPTR, #const16 | (4B) | |
| Xadd XDPTR, (Rn&Rn-1) | (2B) | with n=1...7 |
| Xinc | | | wherein Xmov indicates a register load command, Xadd indicates an adding command, Xpush indicates a stack filling command, Xpop indicates a stack discharge command and Xinc indicates an incrementing command. DPTR, Ri with i=1 ... 7, dadr and X belong to the internal registers of the CPU 30. const16 indicates a 16-bit operand. "&"- signs indicate a concatenation of the two expressions to the left and right. The bytes required for the respective operation code identifier are indicated in brackets on the right hand side.

It is to be pointed out that the possible read commands basing of the free operation code identifiers can be related to all the possible destination registers or another addressable memory in the CPU 30. In addition, possible read commands, based on free operation code identifiers, with indirect addressing can use all the registers or all the memory space within the CPU 30 or each combination of this for forming the 20-bit address to which the read command refers. In addition, combinations of direct and indirect addressing are possible, i.e. a combination of the contents of one or several internal registers of the CPU 30 and one or several bytes (or bits) within an address portion of the free operation code identifier.

It is also to be pointed out that the previous description is easily applicable to free operation code identifiers corresponding to write commands as regards a 20-bit address, wherein only the transmission direction of the accessed memory contents is to be changed to from the CPU 30 to the memory 20.

In the following, in table 1 using the usual notation, examples of possible read commands XMOV are indicated, which can be processed by the supporting means 40 responsive to corresponding free operation code identifiers 310 according to the embodiment of FIG. 2. XMOV is to indicate an operation code entering a memory contents indicated by special registers into, for example, the accumulator register, as will be discussed in greater detail referring to generic pointers. Subsequently, Ri with i=0 . . . 4 is to be an internal register Ri, XDPTR is to be the external data pointer 325 and A is to be the accumulator 250 and "off8" is to indicate an offset value of 8 bits. "&" indicates a concatenation of the expressions to the left and the right.

TABLE 1

| Read Commands | | |
|---|---|---|
| Xmov A @XDPTR+off8 | (3B) | |
| Xmov A @XDPTR+Rx | (3B) | with Rx = {R0,R4} |
| Xmov A @(R3&R2&R1)+off8 | (3B) | |
| Xmov A @(R3&R2&R1)+Rx | (3B) | with Rx = {R0,R4} |

It is also pointed out that it can be provided that the supporting means 40 supports a free operation code provided for handling generic pointers or is responsive to it. A generic pointer consists of an address and an indication of the addressing type. The addressing type indication basically indicates using which command the memory is to be accessed with the address of the generic pointer. The 8051 architecture provides four addressing types to which the access type using new free operation code identifiers is added. The four 8051 addressing types include:

IData access, wherein the access (read or write) takes place in relation to the IRAM 220 of the CPU 30 having a size of 256 bytes and thus can be addressed with only one byte, XData access, wherein the access takes place (MOVX) to the currently set data memory window 380 of the external memory (XRAM) and two bytes are indicated for addressing, PData access, wherein the access also takes place to the currently set data memory window 380 of the external memory (XRAM) and, for addressing, a register AdrXh is combined with the predetermined register R1 to yield a 16-bit address, and code access, wherein the currently set code memory window 370 is accessed (MOVC) and two bytes are also indicated for addressing. When outputting the respective 16-bit address by the CPU 30 on the data and address lines 60 and 80, a code access could, for example, be differentiated from an Xdata access towards the outside by indicating a different bus status on an additional line (not shown).

In a following embodiment, the information of the generic pointer, i.e. the address indication and the addressing type indication, similarly to the embodiment of FIG. 2, regarding the indication of the 20-bit address, within the machine code sequence is stored before in the internal registers R1 to R3, whereupon a subsequent free operation code identifier corresponding to a command for handling generic pointers is provided to activate the supporting means 40 which subsequently, depending on the addressing type indication, supplies to the CPU 30 a predetermined CPU operation code identifier having an address region set depending on the address indication of the generic pointer. The generic pointer to which the command for handling generic pointers is referred can, however, be also contained in a portion of the free operation code identifier of the command for handling generic pointers itself. Like in the description of FIG. 2, it is pointed out that not only the usage of internal registers for indirect addressing is possible, but that further external registers, such as, for example, the external XDPTR register 325, can be used, wherein the following description can easily be transferred to this case.

In the following table 2, with the example of read processes, for each type of access indicated in the first column, the command actually aimed at in the usual notation is listed in the second column, the contents of the register R3 is listed in the third column, the contents of the register R2 is listed in the fourth column, the contents of the register R1 at a respective time when the code access to the free operation code identifier for handling generic pointers takes place is listed in the fifth column and the CPU operation code identifier supplied to the CPU 30 by the supporting means 40 or the corresponding command in the usual notation is listed in the sixth column. Here, the @ sign is to indicate the memory contents to which the following expression, as an address, points, A indicates the accumulator 250, AdrXh indicates an internal register of the CPU 30, MOVX indicates a read/write command regarding the memory 20, MOV indicates a read/write command referring to the internal memory IRAM 220 of the CPU 30 and MOVC indicates a code access in relation to the memory 20.

TABLE 2

| Addr. type | Effect aimed at | R3 8 bit | R2 8 bit | R1 8 bit | operation code identifier supplied to the CPU |
| --- | --- | --- | --- | --- | --- |
| Idata access | MOV A, @R1 | 00h | —* | address indication | MOV A, @R1 |
| Xdata access | MOVX A, @ (R2,R1) | 01h | | address indication | MOVX A, @R1 |
| Pdata access | MOVX A, @ (AdrXh, R1) | FEh | AdrXh | address indication | MOVX A, @R1 |
| code access | MOVC A, @A+ (R2, R1) | FFh | | address indication | MOVC A, @A+DPTR |

TABLE 2-continued

| Addr. type | Effect aimed at | R3 8 bit | R2 8 bit | R1 8 bit | operation code identifier supplied to the CPU |
| --- | --- | --- | --- | --- | --- |
| 20-bit data access | MOVX A, @ (R3,R2, R1) | 10h–EFh | | address indication | MOVX A, @R1 |

*arbitrary value

In the case that the supporting means 40 receives the free operation code identifier for handling a generic pointer, the supporting means 40 consequently decodes the contents of the register R3 where the addressing type indication is stored, to feed, depending on the addressing type indication, in the case that the addressing type is not a 20-bit data access, the central processing unit 30 a CPU operation code identifier corresponding to a write/read command in relation to the memory associated to the addressing type, and in the case that the addressing type indication corresponds to a 20-bit data access, to feed the central processing unit 30 a predetermined CPU operation code identifier corresponding to a write/read command in relation to the memory 20, and subsequently, if suitable, to take predetermined action to suitably manipulate address signals of the central processing unit 30.

In the case of an IData access, the supporting means 40, instead of the free operation code identifier for handling generic pointers, which subsequently, regarding the usual notation, will be referred to as XMOV operation code, feeds the CPU 30 the operation code identifier for "MOV A, @R1".

In the case of an XData access, the CPU 30 is fed the CPU operation code for "MOVX A, @R1" instead of the XMOV operation code, wherein the supporting means 40 manipulates the 16-bit address output by the CPU 30 responsive to the CPU operation code during the address transfer regarding the more significant byte corresponding to the contents of the internal register R2 and passes the manipulated address on to the MMU 50.

In the case of the code access, the CPU 30 is fed the CPU operation code for "MOVC A, @+DPTR" instead of the XMOV operation code, wherein the supporting means 40 manipulates the 16-bit address output by the CPU 30 responsive to the CPU operation code fed during the address transfer according to the contents of the internal registers R2 and R1 and outputs it to the MMU 50 in a changed form.

In the case of a PData access, the CPU 30 is fed the CPU operation code for "MOVX A, @R1" instead of the XMOV operation code.

In the case of a 20-bit data access, the CPU 30 is fed the CPU operation code for "MOVX A, @R1" instead of the XMOV operation code, wherein the supporting means 40, as has already been described above, manipulates the address output by the CPU 30 during the address transfer with the contents of the internal registers R2 to R3 and outputs it to the memory 20 in a changed form.

The advantage of providing a free operation code for handling generic pointers is that the handling of generic pointers takes place in hardware, while software-decoding would usually be required for this. In a special realization of the controller of FIG. 1 with providing a special free operation code for handling generic pointers, a time saving of about 20 clock cycles has been obtained.

It is to be pointed out that, as is shown in table 2, several codings, i.e. 1h-Eh, are possible for coding the indication that this is a 20-bit data access. These 14 combinations of four bits could be used to enable addressing of a 14 MB memory, together with another 20 bits, instead of, in the present embodiment, a 1 MB memory by using 24 bits for addressing and by using 16-bit lines instead of 12-bit lines 180, 190.

After the course of steps for the controller of FIG. 1 has been described hereinbefore referring to free operation codes relating to read/write commands, the mode of operation of the controller 10 will be described subsequently in the context with free operation codes corresponding to jump commands, such as, for example, a jump command with return intention or without return intention.

Figure 3:
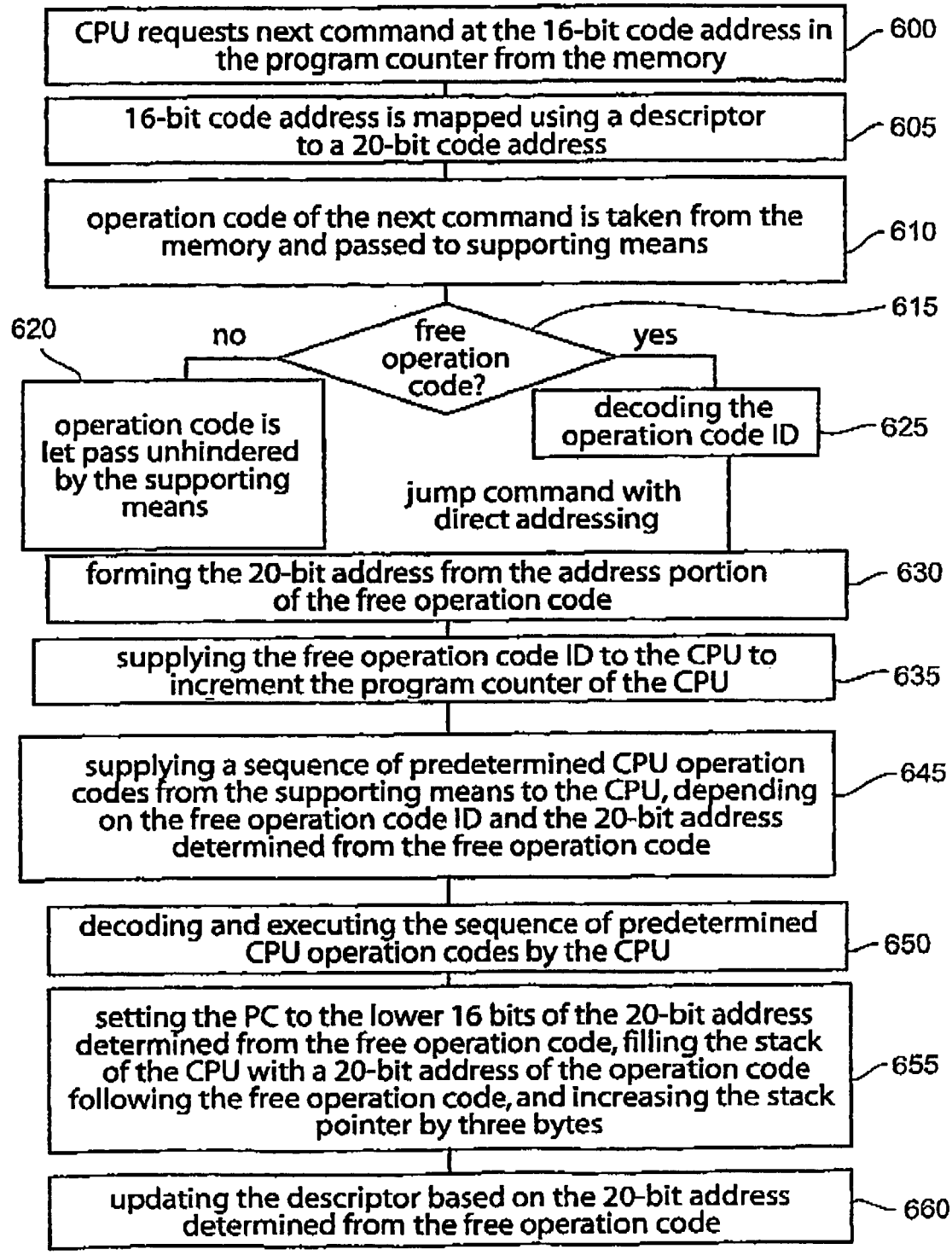
FIG. 3 is a flow chart showing the steps performed in the controller of FIG. 1 in the case that the free operation code corresponds to a jump command with direct addressing with return intention.
Figure 4:
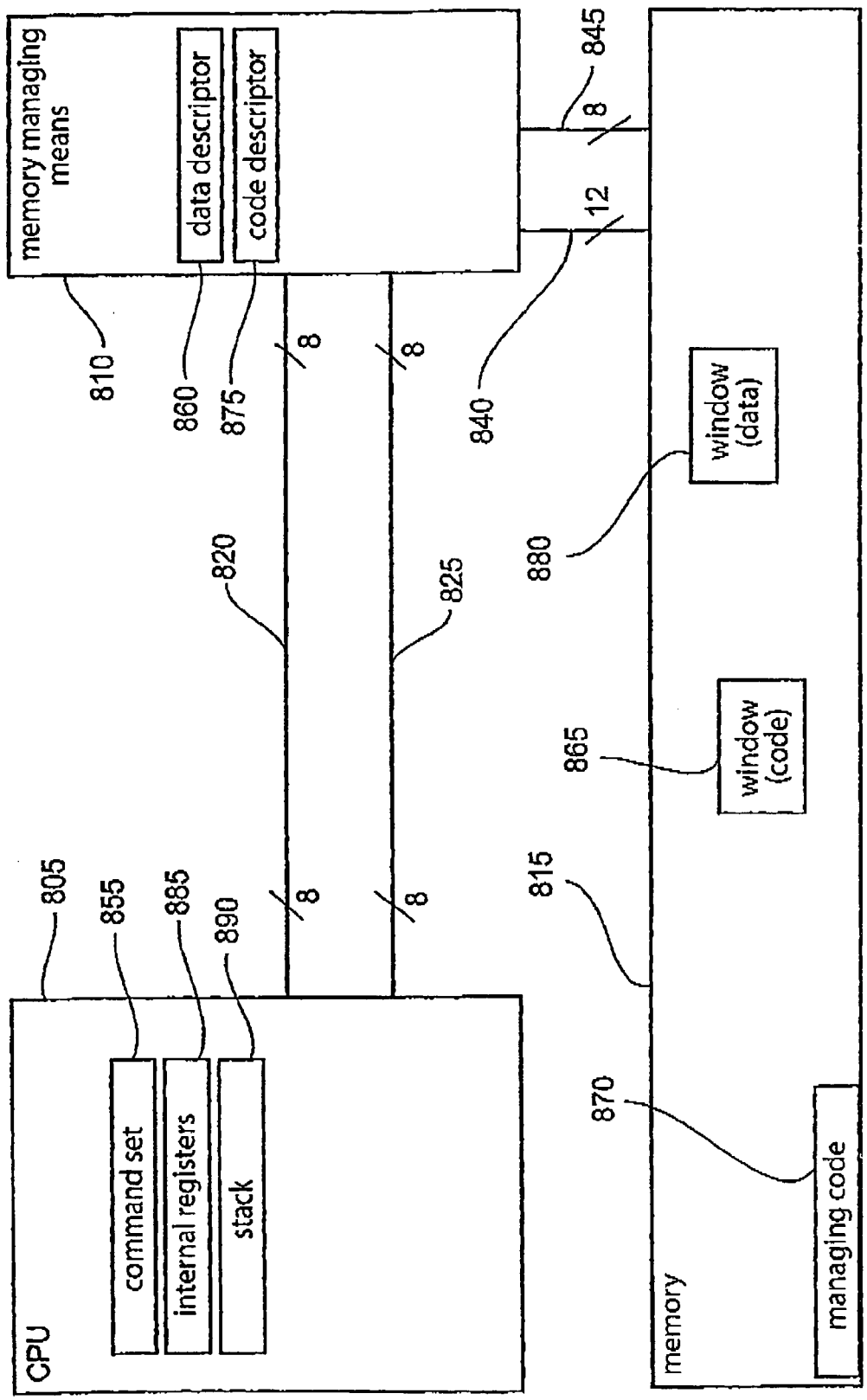
FIG. 4 is a block diagram of a controller using a previous possible solution to extend the addressing possibilities of a CPU.

FIG. 3 shows the course of steps, as takes place in the controller of FIG. 1, regarding an embodiment wherein the CPU requests the next operation code identifier for processing and this is a free operation code identifier relating to a jump command with direct addressing and with return intention. Like in the previous embodiments, the request of the next operation code identifier takes place indicating the code address in the program counter. Put differently, it is assumed that a previous jump command has been processed directly before it. Otherwise, the request only takes place by outputting a request signal from the CPU 30 and using a 20-bit code address fed by the memory 20.

In step 600, the CPU 30 requests a next command to be executed which, in this case, directly follows a jump command, by outputting the 16-bit code address stored in the program counter 240 on the address and data lines 80, 60. The 16-bit code address of the program counter 240 is mapped or manipulated in step 605, after it has passed the supporting means 40 unchanged, by the MMU 50 using the code descriptor 340 to a 20-bit code address passing on the MMU 50 to the memory 20. The 16-bit code address stored in the program counter, for example, corresponds to a less significant part of the 20-bit code address, while the code descriptor 340 corresponds to a more significant 4-bit part of the 20-bit address or to a more significant n-bit part, wherein n, for example, equals 12. The mapping or manipulation of the 16-bit code address is performed by the MMU 50 by means of supplementing it. Alternatively, the code descriptor 340 can correspond to a 20-bit basis or starting address of a bank so that the mapping is performed by means of adding the descriptor 340 to the 16-bit code address.

In step 610, the operation code identifier of the requested command, at the 20-bit code address having resulted from the code descriptor 340 and the 16-bit program counter 240, is taken from the memory 20 and reaches the supporting means 40 unhindered from the MMU 50 via the address and data lines 150, 190 and 120.

In step 615, the decoder 300 of the supporting means 40 checks whether the operation code identifier received by the memory 20 is a free operation code identifier, as is indicated by the operation code. In the case the result in step 615 is that the operation code identifier taken from the memory is not a free operation code identifier, it is passed, in step 620, unhindered in the supporting means 40 and passed on to the CPU 30 via the address and data lines 60 and 80, whereupon the CPU operation code is decoded and executed by the CPU 30 in the conventional manner. If the operation code identifier from the memory 20 is, however, a free operation code identifier, the operation code is decoded in step 625 to determine which of the free operation codes 310 the operation code is.

In the embodiment of FIG. 3 it is, as has been mentioned before, assumed that the requested operation code identifier is a free operation code identifier referring to a jump command with direct addressing and with return intention. In step 630, the supporting means 40, from the address portion contained in the free operation code identifier, forms the 20-bit address to which the new jump command is related and which is the destination address of the jump command corresponding to the free operation code identifier. This step can, for example, also include determining an offset value directly from another portion of the free operation code identifier or indirectly from a register internal or external to the CPU 30 and adding it to the 20-bit address indicated in the address section by the adder 320. The free operation code identifier, for example, includes a byte for the operation code and three more bytes, of which 20 bits indicate the 20-bit address and the remaining four bits indicate the offset value.

In step 635, the CPU 30 is fed the free operation code by the supporting means 40 although the free operation code does not belong to the CPU operation codes determining the command set 290. Step 635 is provided to increment the program counter 240 in the CPU to consider the fact that the free operation code identifier corresponding to the jump command with direct 20-bit addressing, requires 4 bytes, while a CPU operation code identifier of a CALL command subsequently fed to the CPU 30 is only 3 bytes long. Step 635 can, however, also be omitted when a jump command without return intention is to take place, since the program counter status in this case is not required as a return jump address. Step 635 can also be omitted when the stack 270 of the CPU 30 is described in another way, as will be described subsequently referring to the following step.

In step 645, the CPU 30 is fed, by the supporting means 40, a sequence of predetermined CPU operation code identifiers including at least one jump command from the command set 290 of the CPU 30, referring to a 16-bit address which finally, together with the code descriptor 340, is to give the 20-bit jump address to be, for example, suitably set for subsequent command requests according to steps 600 to 610. The sequence depends on the free operation code and the 20-bit address determined from the internal registers.

In step 650, the CPU 30 decodes the sequence of predetermined CPU operation code identifiers and executes the corresponding commands. As is summed up in step 655, the sequence of CPU operation code identifiers is provided such that the CPU 30 when executing the sequence of CPU operation code identifiers sets the program counter PC to the lower, i.e. less significant, 16 bits of the 20-bit address determined from the internal registers, fills the stack 270 with a 20-bit address pointing to the operation code identifier following the free operation code identifier, and increases the stack pointer 230 by three bytes. Supporting means 40, in step 635, feeds the CPU 30 for example a jump command with return intention referring to a 16-bit destination address corresponding to an offset value of the 20-bit address determined from the address portion in relation to the 64 kbytes bank containing this 20-bit address to set the program counter 240 to the 16-bit destination address, and subsequently, in step 645, a stack filling command (in the usual notation referred to as PUSH commands) corresponding to the missing bits of the 20-bit address to enter the 20-bit address of the operation code identifier following the free operation code identifier into the stack 270. Or the supporting means 40 for example feeds the CPU 30, in step 635, a jump command without return intention and then, in step 645, three stack filling commands (in the usual notation referred to as FUSR commands) respectively corresponding to a portion of the 20-bit address to enter the 20-bit address of the operation code identifier following the free operation code identifier into the stack 270.

In step 660, the supporting means 40 performs an actualization or adaptation of the code descriptor 340 based on the 20-bit address determined from the address portion so that, subsequently, the code descriptor 340 is set in such a way that the 20-bit address is contained in the code memory window 370 and the program counter 240 points to the desired position within the code memory window 370. In this way, the supporting means 40 manages the code descriptor 340.

Corresponding to the free data accesses, the advantage results in code jumps, by the present invention, that managing the code descriptor required due to the memory size maximally addressable for the CPU need not be obtained by software-resetting the code descriptor but that resetting can be obtained by a free operation code identifier corresponding to a 20-bit jump command and responds to the supporting means 40 in order to feed the CPU 30 information relating to the 20-bit address and at the same time update or adapt the code descriptor. In particular in jumps with return intention in which the software expenditure for setting anew and resetting the code descriptor is very complicated, a jump free operation code identifier offers a considerable advantage. In addition, the usage of jump commands from the command set 290 still remains possible since the supporting means 40 is transparent for the CPU operation codes determining the command set 290 and does not respond to them. The jump commands from the command set 290 are consequently executed with regard to the currently set or fixed memory window 370.

It is to be pointed out that, similarly to the data accesses described referring to FIG. 2, in code jumps, too, there are different possibilities for forming the 20-bit address to which the jump command is related. In particular, a free operation code using indirect addressing according to the embodiment of FIG. 2 is feasible.

After the mode of operation of the controller of FIG. 1 has been described hereinbefore relating to the mode of operation when free operation codes relating to code jumps or data accesses occur, special embodiments referring to different possible variations and improvements of the simplified illustration hereinbefore will be described.

It can be provided to realize the commands executed by the supporting means 40, to which the free operation codes are assigned, as atomic commands which cannot be interrupted to the supporting means 40 by interrupt signals on the interrupt line 90 by the CPU 30 or on the interrupt line 130 by the MMU 50. In this case, the supporting means stops incoming interrupt signals. Apart from that, it is also possible to use further free operation codes 310 in order to realize non-interruptible code sequences as atomic commands.

Although it has been described before that both the code and the data memory window 370 and 380 have a size of 64 kBytes and that only one code and one data descriptor 330 and 340 must be managed in the MMU 50, it can also be provided that the code memory window 370 and/or the data memory window 380 are divided into several segments together resulting in 64 kBytes. Possible segment sizes are, for example, 16 kbytes or 32 kBytes. In the case of a 32 kbytes segment size of the memory windows 370 and 380, two data descriptors and two code descriptors would be managed in the MMU 50. It could, for example, be provided to use one respective memory segment in relation to the ROM and XRAM memory areas and to use the respective other memory segment in relation to the EEPROM memory area. In 20-bit jumps, the two descriptors or only one would be adapted automatically. In a 32 k program counter overflow, i.e. exceeding the program counter 240 of 32 k, the MMU 50 would be incremented or decremented automatically. Overflow and underflow would also have to be dealt with correctly for relative jumps. In relative jumps exiting a segment, the program counter in the CPU is, for example, adapted and the MMU descriptors are reset. When exiting the program counter of a segment, a so-called auto-incrementer, the procedure is, for example, similar to that of relative jumps.

In addition, it is possible that there are several banks of internal registers, such as, for example, the registers R1 to R3, and that when accessing or polling the contents of the registers R1 to R3 by the supporting means, as has been described hereinbefore, the bank just set is used. Furthermore, other internal registers of the CPU than the registers R0 to R7, dadr and DPTR mentioned above can generally be used for indirect addressing.

Referring to the previous description, it is to be pointed out that different modifications are possible as regards the setup of the controller of FIG. 1. Thus, it is, for example, not necessary that the MMU 50 and the supporting means 40 be separated from each other. The descriptors and the stack extension can, for example, be managed by the supporting means 40 or by means of it. When the support of programs using memory access commands or jump commands from the command set 290 of the CPU 30 is omitted and only programs using free operation codes for code jumps and data accesses are supported, the data descriptor can be dispensed with completely. The advantage of programs only using 20-bit data access or jump commands is that for such programs, a continually addressable memory having a size of 1 megabyte would be visible or addressable. In addition, it is to be pointed out that the setup of the CPU can be formed differently so that, for example, the accumulator register 250, the stack pointer 230 and the program counter 240 may be managed in the IRAM 220. The IRAM can also include any other memory type or any combinations of this, such as, for example, an NVM.

In relation to the courses illustrated in FIGS. 2 and 3, it is to be pointed out that they may be changed as regards the order of the steps.

Additionally and alternatively to the 20-bit code jump command with return intention (FCALL) described wherein three bytes are put to the stack and the MMU is reconfigured automatically, a 20-bit code jump command without return intention (FJMP) executed like the 20-bit FCALL jump described before but without storing the return jump data in the stack, may be provided. As an example, in all the 20-bit jump commands with return option or return intention, three bytes are written to the stack, wherein the CPU return commands (RET) are provided such that three bytes are taken from the stack. Based on the bytes taken from the stack, the code descriptor could be brought to the state before the last CALL command. For each interrupt level, a separate context may be stored in order not to have to restore the old context when a return jump occurs, i.e. a return jump command to the command set 290.

The previous embodiment of a controller thus solves several problems which are based on using an architecture sufficient as regards the processing speed but insufficient as regards the addressing capacity. The controller described hereinbefore allows a direct efficient access to data in an expanded address space. In a special realization, the access time is only two clock cycles longer than in accesses to data in a currently set memory window. In addition, when using a mixed, both direct and indirect addressing, using, for example, the data pointer and a free section of the free operation code of four bits, by means of the 24-bit adder in the supporting means, without changing the data pointer, several bytes ($2^4=16$ bytes) of neighboring data can be accessed directly by using the eight bits as an offset as regards the address formed of the address portion of the free operation code and the data pointer. The code segmenting by the MMU is thus made easier by the fact that the programmer does no longer have to explicitly reconfigure the MMU to execute a code in a non-set memory window. Reconfiguring and restoring take place automatically by using 20-bit code jump and data access commands based on free operation codes so that the programmers sees the entire physical address space of 1 MB as a linear addressable address space, wherein at the same time a down compatibility to programs only basing on the command set of the CPU is maintained. For generic pointers, instead of the complicated software-decoding, hardware-decoding is used enabling a considerably faster processing. Like in 20-bit data accesses, even in handling generic pointers, an offset value from an unused section of the free operation code identifier can be used to efficiently access consecutive data without changing a data pointer. In addition, the internal stack range can be extended by an external one and non-interruptible code sequences can be realized as atomic commands. These novelties and improvements are obtained by only little changes of an existing CPU layout by translating free operation code identifiers into operation code identifier sequences and by modifying the CPU external control signals by supporting means or a shell which can be executed as a state machine in such a way that the commands, towards the outside, look like the desired commands.

In particular in the chip card area, the advantage results by the present invention that a capability excess and a code additional expenditure with the customer are minimized and that at the same time an efficient compiler support is obtained.

As regards the MMU and the supporting means, it is to be pointed out that they can be realized as a unit.

Finally, it is to be pointed out that the present invention is further applicable to other controller architectures than the 8051 architecture mentioned above and that, consequently, the memory size indications as regards the memory window and of the memory and the byte-wise readout and the number of address and data lines only illustrate exemplary examples.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for controlling a central processing unit for addressing in relation to a memory, wherein a set of operation code identifiers including at least one special operation code identifier is associated to the central processing unit, wherein the central processing unit is arranged to address a first memory area having a first memory size of the memory, wherein the method comprises the following steps:

monitoring a data traffic from the memory to the central processing unit by supporting means coupled to the central processing unit;

in the case in which the data traffic from the memory to the central processing unit includes the special operation code identifier, forming a new address by the supporting means, wherein the new address is defined in a second memory area having a second memory size of the memory, wherein the second memory size is larger than the first memory size;

providing a predetermined operation code identifier to which a jump command from a conimand set of the central processing unit is assigned, to the central processing unit by the supporting means, wherein the predetermined operation code identifier has a destination address in relation to the first memory area; and managing a code descriptor by the supporting means, yielding, together with the destination address, the new address.

2. A controller having:

a central processing unit having a set of operation code identifiers including at least one special operation code identifier, wherein the central processing unit is arranged to address a first memory area having a first memory size of a memory;

supporting means coupled to the central processing unit to monitor a data traffic from the memory to the central processing unit, wherein the supporting means is arranged to perform, in the case in which the data traffic from the memory to the central processing unit includes the special operation code identifier, the following steps:

forming a new address, wherein the new address is defined in a second memory area having a second memory size of the memory, wherein the second memory area is larger than the first memory area, and providing a predetermined operation code identifier to which a jump command from a command set of the central processing unit is assigned, to the central processing unit, wherein the predetermined operation code identifier has a destination address in relation to the first memory area; and managing a code descriptor, yielding, together with the destination address, the new address.

3. The controller according to claim 2, wherein the set of operation code identifiers comprises a plurality of operation code identifiers, to which commands are associated determining the command set of the central processing unit, and wherein no command from the command set of the central processing unit is assigned to the special operation code identifier.

4. The controller according to claim 2, further comprising:

an external register for storing the code descriptor, wherein the external register is arranged externally of the central processing unit, wherein the code descriptor is provided to define the position of the first memory area within the second memory area, wherein the supporting means is arranged to perform, in the case that the data traffic from the memory to the central processing unit includes the special operation code identifier, the following steps:

setting a value of the code descriptor in such a way that the new address is contained in the first memory area, and setting the destination address in relation to the first memory area in such a way that the destination address in relation to the first memory area corresponds to the new address in relation to the second memory area.

5. The controller according to claim 4, further comprising:
a program counter included in the central processing unit, in which a code address in relation to the first memory area is stored;
means coupled to the central processing unit in order to monitor a data traffic from the central processing unit to the memory, and arranged to perform, in the case that the data traffic from the central processing unit to the memory includes the code address in relation to the first memory area, the following steps:
manipulating it based on the contents of the code descriptor to obtain the new address in relation to the second memory area; and
passing it on to the memory in a changed form in order to access the memory.

6. The controller according to claim 2, wherein the central processing unit is arranged to perform, responsive to the supplied predetermined operation code identifier for requesting a next operation code identifier to be processed, the following steps:
storing the destination address in a program counter of the central processing unit, and
outputting it within the data traffic from the central processing unit to the memory.

7. The controller according to claim 2, wherein the central processing unit further comprises a stack memory and a stack memory pointer indicating a position in the stack memory where data is currently taken from the stack memory by the central processing unit or added to it, and wherein the supporting means is adapted to further provide at least another predetermined operation code identifier to the central processing unit, wherein a command from the command set of the central processing unit for filling the stack memory at the stack memory pointer with a value depending on a current address in relation to the second memory area at which the operation code identifier following the special operation code identifier is arranged is assigned to the at least one further operation code identifier.

8. The controller according to claim 2, wherein the destination address is a less significant part of the new address and the descriptor is a more significant part of the new address.

9. The controller according to claim 2, wherein the central processing unit comprises at least an internal register and the supporting means is coupled to the central processing unit to determine the contents of the at least one internal register, and arranged to perform the following steps when forming the new address:
determining the contents of the at least one internal register, and
forming the new address from the contents of the at least one internal register.

10. The controller according to claim 2, comprising at least one external data pointer register arranged externally of the central processing unit, and wherein the supporting means is arranged to perform the following steps when forming the new address:
determining the contents of the at least one external data pointer register, and
forming the new address from the contents of the at least one external data pointer register.

11. The controller according to claim 2, wherein the supporting means is arranged to perform the following step when forming the new address:
forming the new address at least partly from an address portion of the operation code identifier.

12. The controller according to claim 11, wherein the supporting means is arranged to perform the following step when forming the new address at least partly from the address portion of the operation code identifier:
providing the central processing unit with the or another special operation code identifier, and
wherein the central processing unit comprises a program counter in which a code address in relation to the first memory area, is stored, and the central processing unit is arranged to perform the following steps:
requesting a next operation code identifier to be processed by means of the code address, and
increasing the program counter responsive to the special operation code identifier supplied to the central processing unit and otherwise ignoring the special operation code identifier supplied to the central processing unit.

13. The controller according to claim 2, wherein the supporting means is arranged to perform, in the case in which the special operation code identifier is included in the data traffic from the memory to the central processing unit, the following step:
stopping incoming interrupt signals.

14. A method for controlling a central processing unit for addressing in relation to a memory, wherein a set of operation code identifiers including at least a special operation code identifier is associated to the central processing unit, wherein the central processing unit is arranged to address a first memory area having a first memory size of the memory, wherein the method comprises the following steps:
monitoring a data traffic from the memory to the central processing unit and a data traffic from the central processing unit to the memory by supporting means coupled to the central processing unit;
if the data traffic from the memory to the central processing unit includes the special operation code identifier, forming a new address by the supporting means, wherein the new address is defined in a second memory area having a second memory size of the memory, wherein the second memory size is larger than the first memory size;
providing a predetermined operation code identifier to which a command from the command set of the central processing unit is assigned, to the central processing unit by the supporting means; and
manipulating an address defined in relation to the first memory area, within the data traffic from the central processing unit to the memory based on the new address by the supporting means in order to obtain a manipulated address in relation to the second memory area.

15. A controller having:
a central processing unit having a set of operation code identifiers including at least a special operation code identifier, wherein the central processing unit is arranged to address a first memory area having a first memory size of a memory;
supporting means coupled to the central processing unit in order to monitor a data traffic from the memory to the central processing unit and a data traffic from the central processing unit to the memory, wherein the supporting means is arranged to perform, in the case that the data traffic from the memory to the central processing unit includes the special operation code identifier, the following steps:
- forming a new address, wherein the new address is defined in a second memory area having a second memory size of the memory, wherein the second memory size is larger than the first memory size;
- providing a predetermined operation code identifier to which a command from the command set of the central processing unit is associated, to the central processing unit; and
- manipulating an address defined in relation to the first memory area, within the data traffic from the central processing unit to the memory based on the new address in order to obtain a manipulated address in relation to the second memory area.

16. The controller according to claim 15, wherein the set of operation code identifiers comprises a plurality of operation code identifiers to which commands are assigned determining the command set of the central processing unit, and wherein no command from the command set of the central processing unit is associated to the special operation code identifier.

17. The controller according to claim 15, wherein the predetermined operation code identifier is associated to a write or read command from the command set of the central processing unit.

18. The controller according to claim 15, wherein the command relates to an access address in relation to the first memory area corresponding to a portion of the new address, and wherein the supporting means is arranged to perform, when manipulating the address defined in relation to the first memory area within the data traffic from the central processing unit to the memory, the following step:
- supplementing it by a remaining portion of the new address.

19. The controller according to claim 18, wherein the command further relates to an offset value, and wherein the supporting means is arranged to add the offset value to the manipulated address.

20. The controller according to claim 15, wherein the command relates to an access address in relation to the first memory area, and wherein the supporting means is arranged to perform, when manipulating the address defined in relation to the first memory area within the data traffic from the central processing unit to the memory, the following step:
- replacing it by the new address.

21. The controller according to claim 15, further comprising:
- an external register for storing an address, wherein the external register is arranged externally of the central processing unit, wherein this address is provided to indicate a position of the first memory area within the second memory area;
- means coupled to the central processing unit to monitor the data traffic from the central processing unit to the memory and arranged to perform, in the case that the data traffic from the central processing unit to the memory includes an address defined in relation to the first memory area, the following steps:
  - manipulating it based on the contents of the external register to obtain a corresponding address in relation to the second memory area, and
  - passing it on to the memory in a changed form to access the memory,
- and wherein the supporting means is arranged to perform, in the case that the data traffic from the memory to the central processing unit includes the special operation code identifier, the following step:
  - adapting the contents of the external register in such a way that the first memory area contains the manipulated address,
- and in the case that the data traffic from the memory to the central processing unit includes an operation code identifier of the plurality of operation code identifiers, to which a read or write command from the command set of the central processing unit is associated, to perform the following steps:
  - passing it on to the central processing unit, and
  - leaving unchanged the address defined in relation to the first memory area, in the data traffic from the central processing unit to the memory.

22. The controller according to claim 15, wherein the special operation code identifier corresponds to a command for handling a generic pointer, wherein the generic pointer consists of an address indication and an addressing type indication, wherein the address indication corresponds to the new address, and wherein the addressing type indication indicates that the address indication refers to the second memory area.

23. The controller according to claim 22, wherein the supporting means is arranged to perform, in the case in which the data traffic from the memory to the central processing unit includes a special operation code identifier corresponding to a command for handling a generic pointer consisting of an address indication and an addressing type indication, the following steps:
- checking the addressing type indication,
- in the case that the addressing type indication indicates that the address indication refers to the second memory area, performing the formation of the new address, the supply of the predetermined operation code identifier and the manipulation of the address, and
- in the case that the addressing type indication indicates that the address indication refers to the first memory area, supplying the central processing unit with an operation code identifier to which a command from the command set referring to the address indication is associated.

24. The controller according to claim 15, wherein the central processing unit comprises at least an internal register and the supporting means is coupled to the central processing unit to determine the contents of the at least one internal register, and arranged to perform the following steps when forming the new address:
- determining the contents of the at least one internal register, and
- forming the new address from the contents of the at least one internal register.

25. The controller according to claim 15, comprising at least one external data pointer register arranged externally of the central processing unit, and wherein the supporting means is arranged to perform the following steps when forming the new address:
- determining the contents of the at least one external data pointer register, and
- forming the new address from the contents of the at least one external data pointer register.

26. The controller according to claim 15, wherein the supporting means is arranged to perform the following step when forming the new address:

forming the new address at least partly from an address portion of the operation code identifier.

27. The controller according to claim 26, wherein the supporting means is arranged to perform the following step when forming the new address at least partly from the address portion of the operation code identifier:
   providing the central processing unit with the or another special operation code identifier, and
   wherein the central processing unit comprises a program counter in which a code address in relation to the first memory area is stored, and the central processing unit is arranged to perform the following steps:
      requesting a next operation code identifier to be processed by means of the code address, and
      increasing the program counter responsive to the special operation code identifier supplied to the central processing unit and otherwise ignoring the special operation code identifier supplied to the central processing unit.

28. The controller according to claim 15, wherein the supporting means is arranged to perform, in the case in which the special operation code identifier is included in the data traffic from the memory to the central processing unit, the following step:
   stopping incoming interrupt signals.

* * * * *

UNITED STATES PATENT AND TRADEMARK OFFICE
CERTIFICATE OF CORRECTION

PATENT NO. : 7,062,632 B2
APPLICATION NO. : 10/760108
DATED : June 13, 2006
INVENTOR(S) : Juergen Freiwald et al.

Page 1 of 1

It is certified that error appears in the above-identified patent and that said Letters Patent is hereby corrected as shown below:

Claim 1:

Column 22, line 13, "conimand" should read --command--.

Signed and Sealed this

Twelfth Day of September, 2006

JON W. DUDAS
*Director of the United States Patent and Trademark Office*